July 23, 1940.   N. S. FOCHT   2,208,969
STABILIZING MEANS FOR VEHICLE BODIES
Filed July 30, 1938   3 Sheets-Sheet 1

Inventor
Nevin S. Focht,
By Wolhaupter & Groff,
Attorneys

July 23, 1940.   N. S. FOCHT   2,208,969
STABILIZING MEANS FOR VEHICLE BODIES
Filed July 30, 1938    3 Sheets-Sheet 2
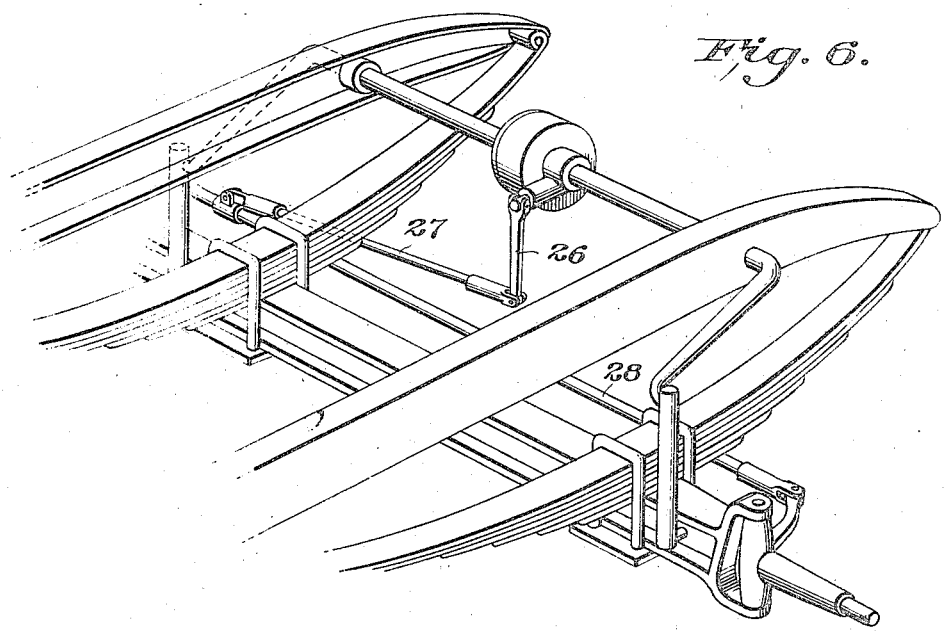
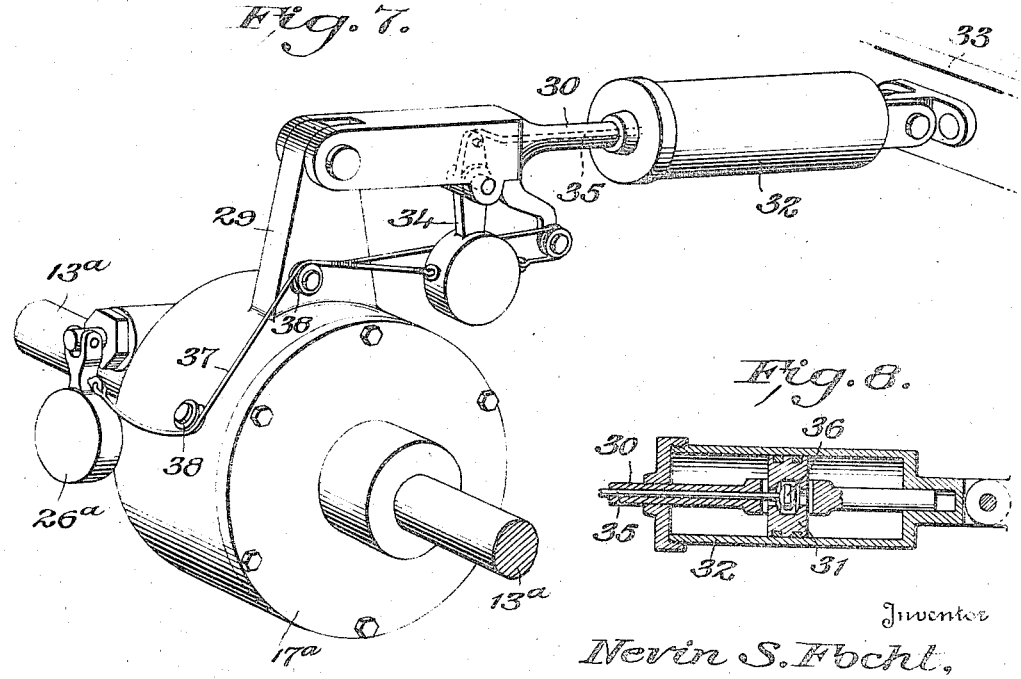
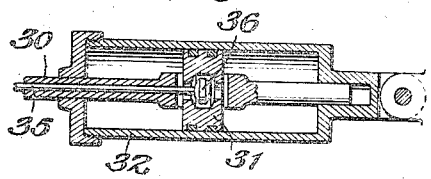

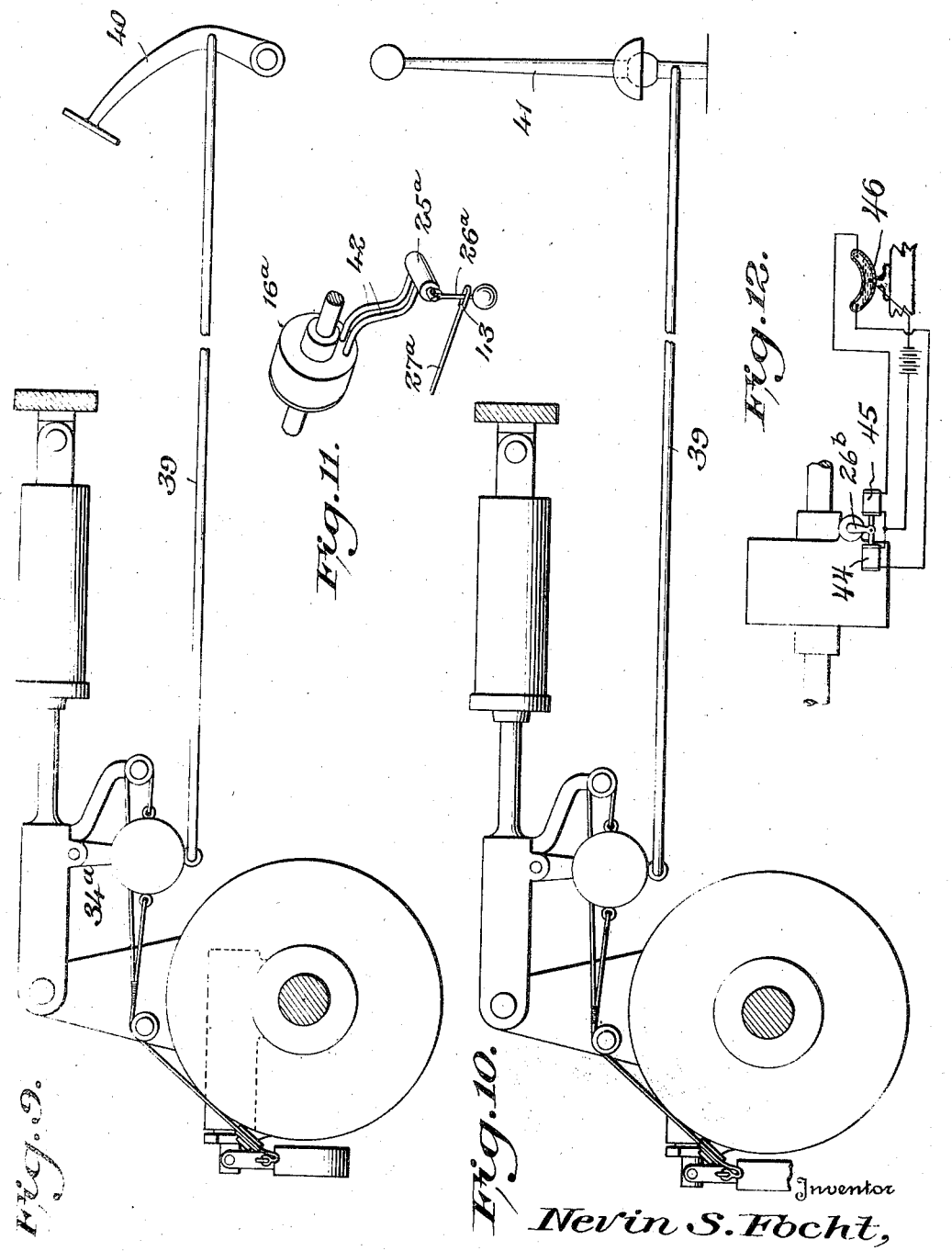

Patented July 23, 1940

2,208,969

UNITED STATES PATENT OFFICE 2,208,969

STABILIZING MEANS FOR VEHICLE BODIES

Nevin S. Focht, East Cleveland, Ohio

Application July 30, 1938, Serial No. 222,289

10 Claims. (Cl. 267—11)

This invention relates to stabilizing means for the spring suspended bodies of motor vehicles, and has particular reference to improvements in means for controlling the sidesway of such bodies.

As is well known, it is necessary, in order that a spring suspended vehicle body shall have easy riding qualities, that the spring suspension of the body must be amply flexible or "soft" to properly absorb, and to thereby prevent from being transmitted to the body, minor shocks produced by movement of the wheels of the vehicle over normal road irregularities. If, however, amply flexible or "soft" springs are employed to accomplish this purpose, they are not, in themselves, satisfactory because of their susceptibility to easy compression to the extent of "bottoming" and to their susceptibility of expanding or rebounding excessively. Therefore, it is general practice to use, in conjunction with springs that are amply flexible or "soft" to absorb normal shocks, suitable shock absorbing devices which permit such springs to act freely within predetermined limits of compression and expansion, sufficient to absorb minor shocks produced by normal road irregularities, but which function to check abnormal compression and expansion of said springs. In any event, if the spring suspension is amply flexible or "soft" to accomplish the purpose stated, it inherently is of a nature to permit more or less free side-sway of the vehicle body; and, as is apparent, the freedom of this side-sway increases with increase in the flexibility or "softness" of the body suspension. Side-sway is uncomfortable and renders driving unsafe, not only because it affects steering, but because it tends to produce capsizing or overturning of the vehicle. Thus, there has arisen the problem of how to prevent or reduce side-sway of vehicle bodies which are suspended by springs amply flexible to absorb shocks produced by normal road irregularities. This problem has been solved, in part, by the provision of a so-called "sway-bar" which is mounted on the vehicle body or chassis transversely thereof so as to tilt or sway therewith and which has a pair of crank arms connected with the axle of the vehicle adjacent to the ends thereof, respectively. When the vehicle is rounding a turn, centrifugal force causes the vehicle body to tilt toward the outside wheel, and this, in turn, causes the "sway-bar" to twist, with the result that its torque reaction counteracts the sway induced by the centrifugal force. In that respect the ordinary "sway-bar" performs its function satisfactorily, but at the same time it is disadvantageous from the standpoint that when it comes into action it has the obvious effect of stiffening the suspension of the vehicle body and thereby detracting from the easy riding qualities thereof. This would not be seriously objectionable if the "sway-bar" came into action only during times when the vehicle is rounding turns, but the difficulty is that the ordinary "sway-bar" comes into action, even on straight stretches of road, where its side-sway resisting action is not needed, whenever only one of the vehicle wheels encounters a bump, for thereby the same result is produced as by tilting of the vehicle body by centrifugal force. Moreover, one or the other of the wheels of a vehicle traveling an ordinary road is constantly meeting a more or less pronounced bump. Consequently, the ordinary "sway-bar" is more or less constantly in action and, consequently, more or less constantly stiffening the suspension of the associated vehicle body. Manifestly, therefore, the advantage gained by the use of an ordinary "sway-bar" respecting reduction of side-sway is, in a large measure, lost by its detraction from the easy riding qualities of the vehicle. Accordingly, the general object of the present invention is to provide a side-sway control means for spring suspended vehicle bodies which is inactive during travel of the vehicle over straight stretches of transversely level road, regardless of irregularities in the road, but which comes into action whenever the vehicle rounds a turn or is, for any reason, tilted, as, for example, because of traveling either side of a crowned road. Thus, according to the present invention, the easy riding qualities of the vehicle are not affected during normal, straight ahead travel of the vehicle, and the suspension of the vehicle body is stiffened only when this is desirable to promote safe driving; viz., during travel of the vehicle around a turn or when the vehicle is tilted due to traveling either side of a crowned road or to any other cause.

An evil which heretofore has accompanied "soft" suspension of a vehicle body is the so-called "nosing-down" of the front of the body and the so-called "heeling-up" of the rear of the body when the brakes are applied; and the so-called "squatting down" of the rear of the body when the vehicle is started suddenly or is quickly accelerated. For various different reasons these actions of the body are quite undesirable. Accordingly, another object of the present invention is to provide means to act through the present side-sway control means, responsive to sudden stopping of the vehicle, to counteract so-called "nosing-down" and "heeling up" of the front and rear portions of the vehicle body, respectively, and to act through said connection responsive to quick starting of the vehicle, to counteract "squatting down" of the rear of the vehicle body.

A general object of the invention is to provide control means, including a part or element actuated by the force causing the vehicle to be displaced from normal position, having the capacity to counteract or correct undesired motion of the vehicle body.

With the foregoing and various other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 6 is a view similar to Fig. 1 illustrating an alternative embodiment of the invention.

Figure 7 is a perspective view illustrating another alternative embodiment of the invention.

Figure 8 is a sectional view through the anchoring clutch of Fig. 6.

Figures 9 and 10 are views similar to Fig. 6 illustrating other alternative embodiments of the invention; and Figures 11 and 12 are detail views illustrating still further alternative embodiments of the invention.

Figure 1:
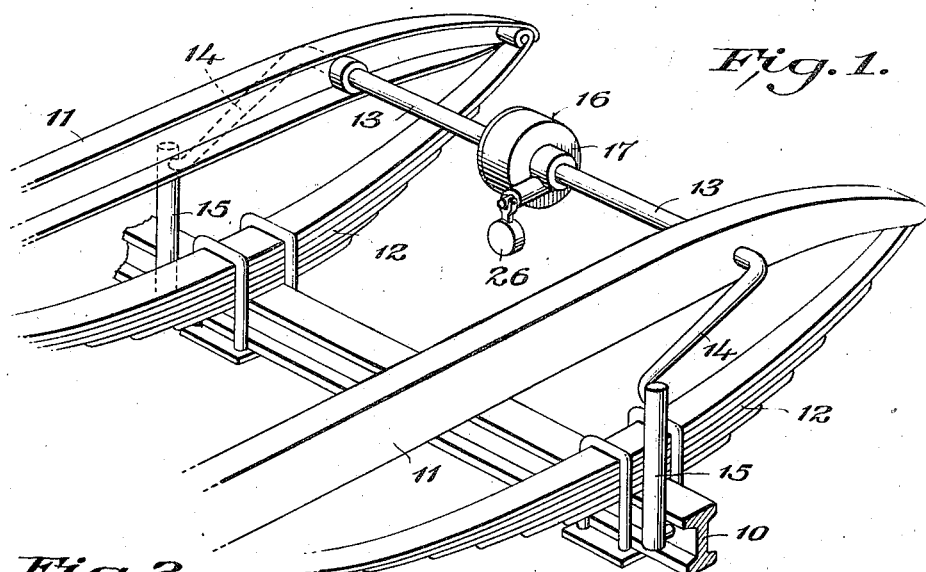
Figure 1 is a perspective view of the front portion of a vehicle frame, illustrating the application thereto of one practical embodiment of the present side-sway control means.

Referring first to the embodiment of the invention illustrated in Fig. 1 of the drawings, 10 designates an axle of a vehicle, 11, 11 designate the side rails of the body carrying frame or chassis of the vehicle, and 12, 12 designate springs interposed between the axle 10 and the side rails 11, 11 and serving to yieldably mount the frame upon said axle, all in accordance with common, well-known practice.

Now, in accordance with the present invention, the means illustrated in Fig. 1 for counteracting side-sway of the vehicle frame and body relative to the axle 10, comprises a sway-bar composed of two separate sections 13, 13 disposed in alinement with each other, transversely with respect to the vehicle, and suitably mounted in, or on, the frame side rails 11, 11, respectively, for rotation with respect thereto. At its outer end, each bar section 13 is suitably provided with a crank-arm 14 suitably connected, as indicated at 15, to the axle 10 near the related end of said axle. On the other hand, at their inner or adjacent ends, the bar sections 13, 13 are connected together by a suitable clutch, designated generally as 16, operable in any suitable manner to permit said bar sections to rotate freely relative to each other when the vehicle frame is in a normal transversely level condition, and to act progressively, responsive to and in accordance with the amount of transverse tilting of the vehicle frame, to resist relative rotation of said bar sections until they become rigidly locked together against rotation relative to each other upon the occurrence of a predetermined amount of tilting of the vehicle frame.

Because of the simple combination and arrangement of parts as just described, it is apparent that, as long as the vehicle frame is transversely level, or substantially transversely level, the means comprising the clutch connected bar sections 13, 13 for counteracting side-sway of the frame and body, obviously is ineffective, in any way, to modify the action of the suspension springs 12, 12, because, when either end of the axle 10 moves either upwardly or downwardly relative to the vehicle frame, the related bar section 13 rotates freely relative to the other bar section. Thus, assuming a "soft" suspension of the vehicle body and straight-ahead travel of the vehicle over a transversely level road, it is apparent that normal road irregularities which produce independent vertical movements of the opposite ends of the axle relative to the vehicle frame, will not cause the side-sway control means to stiffen the body suspension. Therefore, when the vehicle is traveling straight-ahead over a transversely level road, its riding qualities will be as easy as would be the case if the side-sway control means were not present. If, however, the vehicle frame is, for any reason, tilted to either side, either with or relative to the axle 10, as, for example, due to centrifugal force when the vehicle is rounding a turn, or due to the vehicle traveling one side of a crowned road or a transversely inclined road, then, obviously, the clutch 16 acts to resist relative rotation of the bar sections 13, 13 or to lock them together, depending upon the amount of the tilt or sway. In either case, further side-sway or tilting of the body relative to the axle 10 results in twisting of the bar sections and counteracting of the side-sway or tilting by the torque reaction in said bar sections. Of course, since the clutch 16 acts progressively in accordance with the amount of tilting of the vehicle body to lock the bar sections 13, 13 together, it is apparent that counteracting of side-sway or tilting of the vehicle body is progressive and increases with the amount of the side-sway.

Figure 2:
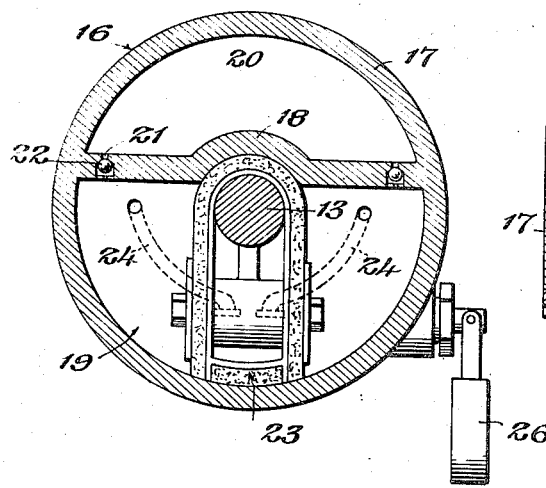
Figure 2 is a transverse section through the clutch compressing part of the control means shown in Fig. 1.
Figure 3:
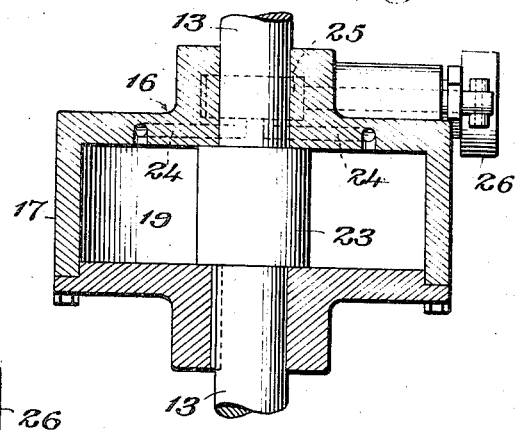
Figure 3 is a horizontal section through the clutch.
Figure 4:
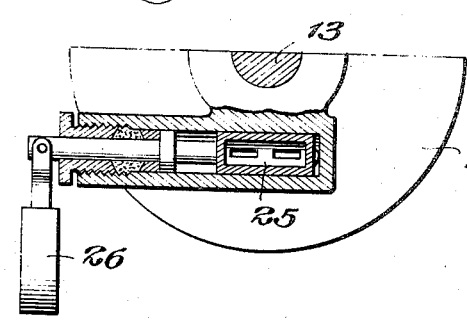
Figures 4 and 5 are detail sectional views through the valve of the clutch.

While, as aforesaid, a clutch of any suitable type, operable in any desired manner, may be provided for connecting together and disconnecting the bar sections 13, 13 under the conditions mentioned, one clutch suitable for the purpose stated is illustrated in detail in Figs. 2, 3 and 4 of the drawings. This clutch is of the hydraulic type and comprises a cylindrical casing 17 divided by a suitable partition 18 into a piston chamber 19 and a liquid reservoir 20, which reservoir is in communication with said piston chamber through ports 21 controlled by check valves 22 opening in the direction of the piston chamber whereby a liquid-filled condition of the piston chamber is assured. In the piston chamber 19 is a vane type oscillatory piston 23, while connecting the portions of said chamber at opposite sides of the piston 23 are ducts 24 through which flow of liquid is controlled by a rotatable valve 25. This valve 25 is disposed horizontally, and transversely relative to the casing 17, and has suitably connected therewith a depending weighted arm 26 which, under the influence of gravity, holds said valve against rotation.

The inner or adjacent ends of the sway-bar sections 13, 13 are rigidly connected to the casing 17 and the piston 23, respectively, and the valve 25 is disposed longitudinally relative to the vehicle and permits free flow of liquid through the ducts 24 as long as the vehicle frame is transversely level. If, however, the vehicle frame is tilted, the clutch casing 17 tilts therewith and, due to the valve 25 being held by the weighted arm 26 against rotation, rotation of said casing relative to said valve occurs, the valve thereby is partly or completely closed and flow of liquid through the ducts 24 thereby is throttled or is completely denied, depending upon the amount of tilting of the frame. Accordingly, as long as the vehicle frame is transversely level, or substantially level, the bar sections are operatively disconnected and are free to rotate relative to each other, since relative rotation of the casing 17 and the piston 23 simply results in by-passing of liquid through the ducts 24 and the valve 25 from one side to the other of the piston 23, but when the vehicle frame is transversely tilted the valve 25 is progressively closed, thereby progressively decreasing by-passing of the liquid and consequently causing progressively intensified counteracting of the tilting or side sway, until, finally the liquid acts as a solid abutment preventing relative rotation of the casing 17 and the piston 23. The locked together bar sections 13 then act in the same manner as a single bar. Thus, if the side-sway is gradual it is gradually checked, and if it is sudden it is suddenly checked.

Preferably, but not necessarily, the weighted arm 26 is pivoted for free forward and rearward swinging movement relative to the valve 25 so that it does not tend to cause binding of said valve when the vehicle is ascending or descending a grade, or is suddenly accelerated or decelerated.

Instead of holding the valve 25 against rotation and depending upon actual tilting of the vehicle frame to effect closing of said valve, the same may have a connection with the steering mechanism of the vehicle so as to be moved toward and to closed position by operation of the steering mechanism to change the direction of travel of the vehicle. Thus, the clutch will be actuated either to resist relative rotation of the bar sections 13, 13 or to lock them together, depending upon the amount of steering movement of the steering mechanism, in advance of the occurrence of any actual side-sway or tilting of the vehicle frame. In this way, better counteractance of side-sway or tilting of the frame may be obtained than by depending upon the actual occurrence of sidesway or tilting to effect its counteractance.

Figure 5:
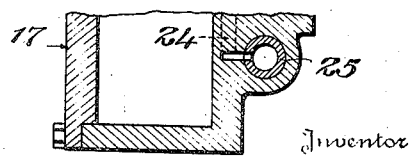

An arrangement whereby the valve 25 is moved toward and to closed position by operation of the steering mechanism of the vehicle, is illustrated in Fig. 6 of the drawings. According to this embodiment of the invention, the clutch valve is equipped with a lever arm 26′ in lieu of the weighted arm 26, and said lever arm is suitably connected, as by a link 27, to the tie rod 28 of the vehicle steering mechanism, or to any other suitable part of said mechanism, so that the valve is open during straight ahead steering and is moved toward closed position by operation of the steering mechanism to change the direction of travel of the vehicle. In other respects the Fig. 5 embodiment of the invention may be the same as illustrated in Figs. 1 to 4.

Referring now particularly to the embodiment of the invention illustrated in Fig. 7 of the drawings, which embodiment of the invention is designed to prevent "nosing down" of the front of the vehicle and "heeling up" of the rear of the vehicle due to application of the brakes, or to prevent "squatting down" of the rear of the vehicle due to quick starting, depending upon whether the structure illustrated is presumed to be located at the front or the rear of the vehicle, it is pointed out that, essentially, the structure is the same as illustrated in Fig. 1 with the addition of means, responsive to sudden stopping or sudden starting of the vehicle, to momentarily close the clutch valve, thereby to lock together the clutch casing and piston, and, at the same time, to anchor the clutch casing against rotation. In this way, the sway-bar sections which are fastened to the clutch casing and piston, respectively, are held against rotation and act to prevent "nosing down" and "heeling up," or "squatting down," as the case may be.

In Fig. 7 the clutch casing is designated as 17a; the sway-bar sections which are fastened to said casing and to the piston therein, respectively, are designated as 13a, 13a, respectively, and are understood to be journaled in the side rails of the vehicle frame and to have cranks at their ends connected with either the front or the rear axle of the vehicle, as the case may be; and the clutch valve is equipped with a weighted arm 26a holding said valve against rotation and thereby maintaining said valve open when the vehicle body is transversely level and causing it to close responsive to side-sway or tilting of the vehicle body, all in accordance structurally and in mode of operation with the Fig. 1 embodiment of the invention.

Rigid with and extending either upwardly or downwardly from the clutch casing 17a is a lever arm 29, and to this lever arm is connected a piston rod 30 carrying a piston 31 which is reciprocable within a cylinder 32. The cylinder 32 is disposed horizontally, or substantially horizontally, extends longitudinally relative to the vehicle, and is suitably anchored against longitudinal movement relative to the vehicle, as, for example, by being fastened to a suitable cross member 33 of the vehicle frame.

Pivoted to the piston rod 30 for free forward and rearward swinging movement is a weighted arm 34 which, under the influence of gravity, normally hangs vertically from said piston rod and which is suitably connected, as by means of a rod 35 extending through said piston rod, with a valve 36 which controls by-passing of liquid from one side to the other of the piston 31. In the normal, vertical position of the arm 34 the valve 36 is open, but when said arm 34 is swung either forwardly or rearwardly, it acts to close said valve 36.

The arm 34 is connected in any suitable manner with the arm 26a so that when said arm 34 is swung either forwardly or rearwardly it swings said arm 26a in one direction or the other to close the clutch valve. In the present instance the connection between the arms 34 and 26a is illustrated by way of example as comprising a cord or other flexible element 37 extending over suitably arranged guide sheaves 38, there being sufficient "slack" in said flexible element to permit the lever arm 26a to swing and to function in its normal manner when the arm 34 is in its normal, vertical position.

As will be apparent from the foregoing, the structure comprising the rod sections 13a, 13a and the clutch connecting said rod sections functions as set forth in connection with the Fig. 1 embodiment of the invention to counteract side-sway. It will also be apparent that when the vehicle is suddenly started or accelerated, or is suddenly stopped, the weighted arm 34 will swing forwardly or rearwardly, as the case may be, and close the valves 36 and 26ª, thereby locking the clutch and, consequently, the rod sections 13ª, 13ª against rotation. As a result, the front or the rear of the vehicle body, as the case may be, will obviously be held by the rod sections 13ª, 13ª against "nosing down" or "heeling up." Of course, immediately the speed of the vehicle is decelerated or accelerated to a point where the arm 34 returns to its normal, vertical position, the valves 36 and 26ª are opened and the structure functions as set forth in connection with the Fig. 1 embodiment of the invention.

Obviously, in lieu of a hydraulic clutch to lock the clutch casing 17ª against rotation, any other suitable type of clutch operable in the manner of the hydraulic clutch described, may be employed.

Instead of employing a weighted arm, such as the arm 34, to actuate the valve 36, said arm 34, or an unweighted arm substituted therefor, may be connected with some suitable part of the brake applying mechanism of the vehicle so that upon application of the brakes said arm is swung to close the valve 36, thereby to prevent "nosing down" of the front of the vehicle and "heeling up" of the rear of the vehicle. Such an arrangement is illustrated in Fig. 9 of the drawings, wherein it will be observed that the arrangement is the same as in Fig. 7, except that an arm 34ª, corresponding to the arm 34 of Fig. 7, is connected by a rod 39 to the brake pedal 40 of the vehicle.

"Squatting down" of the rear of a vehicle seldom occurs except when quickly starting the vehicle from a dead stop. Moreover, quickly starting a vehicle from a dead stop seldom is effected except with the transmission of the vehicle in "low gear." Obviously, therefore, should the rod 39, instead of being connected to the brake applying mechanism, be connected to the gear shift mechanism of the vehicle so as to be shifted to cause closing of the valve 36 when the transmission is placed in "low gear," "squatting down" of the rear of the vehicle due to quickly starting the vehicle will be avoided. An arrangement of this kind is illustrated in Fig. 10 of the drawings, wherein it will be observed that the construction is the same as illustrated in Fig. 9 except that the rod 39, instead of being connected to the brake pedal, is connected to the gear shift lever 41 to be moved by the latter to close the valve 36 when said lever is actuated to "low gear" position.

In its primary aspect the invention contemplates the utilization of fluid type means in association with a connection or connections between the frame or body of the vehicle and the axle to govern body movement relative to the axle, such means in turn being governed or controlled by a part responsive to forces which tend to set up distortion in body poise. Thus, broadly speaking, therefore, the present invention contemplates a sway control means whose effect is to raise the rate of the vehicle springs on the side toward which the body wants to sway. In other words, the raise in the rate of the springs is caused to the extent that the body is not only lessened in its angle of sway but actually is kept level or inclined to the turn.

According to each of the forms of the invention illustrated in Figs. 1 to 10, the control valve is embodied directly in the clutch. This control valve may, however, be located at any suitable point remote from the clutch or its equivalent. This is illustrated in Fig. 11 of the drawings, wherein the control valve, designated generally as 25ª, is located remotely from the clutch, designated generally as 16ª, and is connected therewith by suitable flexible tubing designated as 42. This figure also illustrates that the valve actuating arm 26ª is weighted and that an arm 27ª of the steering mechanism has a lost motion connection with said arm 26ª, as indicated at 43. Therefore, the arm 26ª may function independently of the steering mechanism to control the clutch, as upon crowned roads, and yet, whenever the steering mechanism is actuated to change the direction of travel of the vehicle by an amount which, under ordinary conditions, would cause side-sway, the valve is partly or fully closed by the steering mechanism, thereby causing the mechanism to function in the manner heretofore described to counteract side-sway.

Whether the clutch control valve is embodied in the clutch or is located remotely therefrom, it may be electrically controlled instead of being directly controlled by a weighted arm. This is illustrated in Fig. 12 of the drawings, wherein the valve actuating arm 26ᵇ is shown as being connected with a pair of solenoids 44 and 45, one for swinging said arm in one direction and the other for swinging said arm in the opposite direction. At 46 is designated a mercury switch which is mounted to tilt with the vehicle frame and which is connected with the solenoids 44 and 45 as shown, so that when the vehicle frame tilts in one direction one of the solenoids is energized, and when the vehicle frame tilts in the opposite direction the other of said solenoids is energized. Thus, the operation is the same as heretofore described except that the clutch valve is electrically controlled instead of being directly controlled by a pendulum arm.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a vehicle, an axle, a body-carrying frame yieldably supported upon said axle, a connection between said axle and said frame, means included in said connection rendering said connection ineffective at predetermined times to resist tilting of the axle relative to the frame and effective at other predetermined times to resist tilting of the frame relative to the axle, and means acting through said connection responsive to sudden deceleration of the speed of the vehicle to resist "nosing down" of the front of the frame relative to the axle.

2. In a vehicle, an axle, a body-carrying frame yieldably supported upon said axle, a connection between said axle and said frame, means included in said connection rendering said connection ineffective at predetermined times to resist tilting of the axle relative to the frame and effective at other predetermined times to resist tilting of the frame relative to the axle, and means acting through said connection responsive to sudden deceleration of the speed of the vehicle to resist "heeling up" of the rear of the frame relative to the axle.

3. In a vehicle, an axle, a body-carrying frame yieldably supported upon said axle, a connection between said axle and said frame, means included in said connection rendering said connection ineffective at predetermined times to resist tilting of the axle relative to the frame and effective at other predetermined times to resist tilting of the frame relative to the axle, and means acting through said connection responsive to quick starting of the vehicle to resist squatting down of the rear of the frame relative to the rear axle.

4. In a vehicle, an axle, a body-carrying frame yieldably supported upon said axle, a connection between said axle and said frame including a clutch and operable, when said clutch is engaged, to resist relative tilting of the frame and axle and, when said clutch is released, to permit free relative tilting of the frame and axle, and gravity actuated control means for said clutch effective to maintain a released status of said clutch when the frame is transversely level and to effect an engaged status of said clutch when the frame is tilted from the horizontal, said clutch being of the hydraulic casing and piston type, the control means therefor comprising a casing-carried rotatable valve disposed horizontally and extending longitudinally relative to the vehicle, means whereby said valve is gravity-held against rotation so that the casing is rotatable relative thereto when it is tilted with the frame, said valve being open when the frame is transversely level and being progressively closed by tilting of the casing with the frame.

5. In a vehicle, an axle, a body-carrying frame yieldably supported upon said axle, a pair of rods disposed transversely of the vehicle and rotatably mounted on opposite side portions of said frame, respectively, lever arms carried by said rods and connected to the axle near opposite ends thereof, respectively, a hydraulic clutch including a casing fastened to one of said rods and a piston fastened to the other of said rods, a rotatable valve for controlling by-passing of liquid from one side to the other of said piston, said valve being mounted in said casing and said casing, when tilted with said frame, being rotatable with respect to said valve, and gravity actuated means holding said valve against rotation, said valve being open when the frame is transversely level and being progressively closed by tilting of the clutch casing with the frame.

6. The combination as set forth in claim 5 including means operable responsive to sudden stopping and quick starting of the vehicle to close the clutch control valve and to momentarily and simultaneously lock the clutch casing against rotation.

7. The combination as set forth in claim 5 including a gravity controlled connection between the clutch casing and a part of the frame normally permitting rotation of the clutch casing with its related rod and operable responsive to sudden stopping and quick starting of the vehicle to close the clutch control valve and to momentarily and simultaneously lock the clutch casing against rotation.

8. The combination as set forth in claim 5 including means operable responsive to application of the brakes of the vehicle to lock the clutch casing against rotation and to simultaneously close the clutch control valve.

9. The combination as set forth in claim 5 including gravity controlled hydraulic clutch means operable responsive to sudden stopping and quick starting of the vehicle to momentarily lock the clutch casing against rotation and to simultaneously close the clutch control valve.

10. In a vehicle, an axle, a body-carrying frame yieldably supported upon said axle, a connection between said axle and said frame including a clutch and operable, when said clutch is engaged, to resist relative tilting of the frame and axle and, when said clutch is released, to permit free relative tilting of the frame and axle, said clutch being of the hydraulic casing and piston type, control means therefor comprising a casing-carried rotatable valve disposed horizontally and extending longitudinally relative to the vehicle, and means for rotating said valve to control operation of said clutch.

NEVIN S. FOCHT.